Feb. 17, 1953  W. R. RODGER  2,628,693
NONSQUEALING BONDED BRAKE SHOE
Filed May 16, 1947
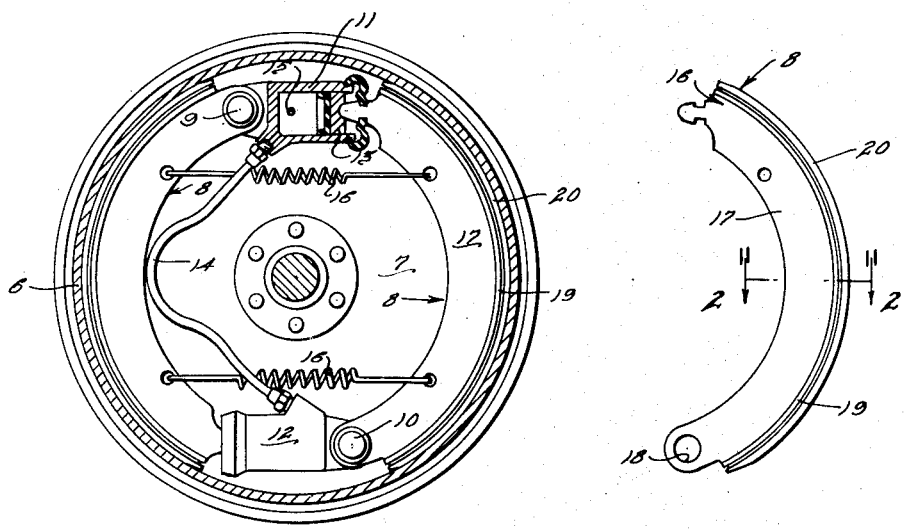
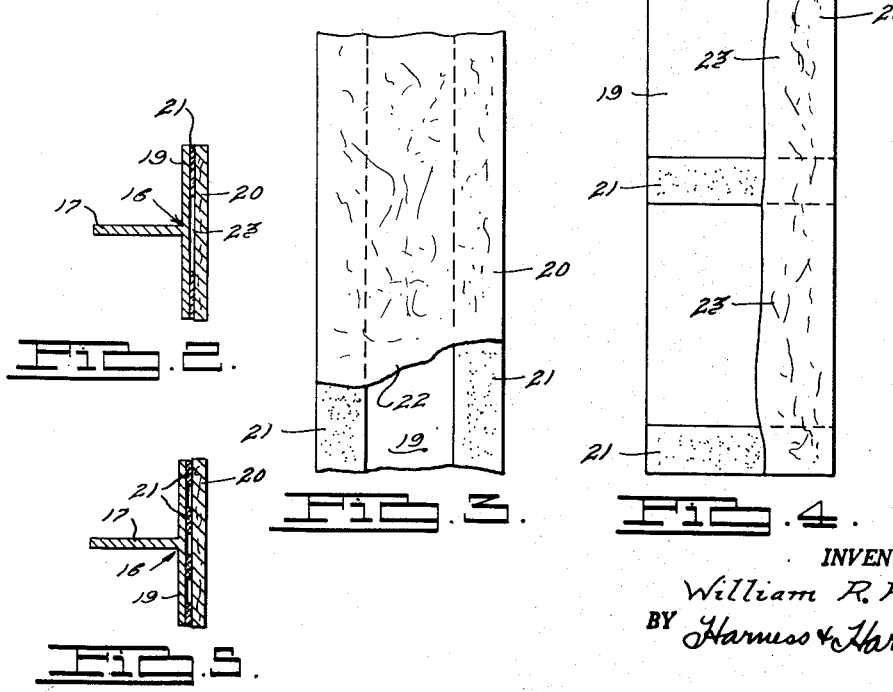
INVENTOR.
William R. Rodger
BY Harness & Harris
ATTORNEYS.

Patented Feb. 17, 1953

2,628,693

UNITED STATES PATENT OFFICE 2,628,693

NONSQUEALING BONDED BRAKE SHOE

William R. Rodger, Detroit, Mich., assignor to Chrysler Corporation, Highland Park, Mich., a corporation of Delaware Application May 16, 1947, Serial No. 748,405

4 Claims. (Cl. 188—234)

This invention relates to improvements in a brake shoe assembly.

An object of the invention is to provide an improved brake shoe assembly in which a shoe element and a lining element of friction material are secured together by an adhesive bonding material in such manner as to minimize objectionable high pitch noise incident to braking engagement of the shoe assembly and the companion brake drum. More particularly, the invention has for an object the provision of such assembly in which the elements thereof have registering surfaces and substantially less than the whole of these surfaces are bonded together by an adhesive material constituting the sole means for securing the elements one to the other, the remainder of the registering surfaces being free from such bonding.

Attachment of the lining material to the brake shoe by surface bonding is desirable in that, for example, the lining material may be used until worn to relatively thin cross-section and no metal-to-metal contact results from a predetermined wear of the lining as is the case when metallic means is employed in the attachment of the lining material to the shoe. However, the shoe assembly with the above components secured together by bonding the entire area of a lining surface to the shoe has an objectionable characteristic in that a noise or squeak of a relatively high pitch is produced when the shoe assembly is forcibly applied to the associated brake drum to effect a braking action. Such relatively high pitch noise is in addition to and to be distinguished from the squeak that may be produced by sudden and forcible application of a brake and which may be influenced at least in part by the frictional characteristics of the lining material.

The aforesaid relatively high pitch noise is believed to be caused by vibration of the brake drum resulting from application of the shoe assembly thereto. By bonding less than the entire area of a lining surface to the shoe, the unbonded section of the lining is relatively free to move relative to the bonded section of the lining and thereby absorb or dissipate some of the energy which would otherwise induce high pitch producing drum vibrations incident to the forcible engagement of the shoe assembly and drum to produce braking action.

An illustrative embodiment of the invention is shown in the accompanying drawings, in which:

Fig. 1 is an elevational view of a brake shoe assembly embodying the invention;

Fig. 2 is an enlarged sectional view taken on line 2—2 of Fig. 1;

Fig. 3 is an enlarged fragmentary plan view of the Fig. 1 assembly, a portion of the lining being broken away;

Fig. 4 is a view similar to Fig. 3, but showing a a further embodiment of the spaced bonded areas;

Fig. 5 is a sectional view, similar to Fig. 2, but illustrating a still further arrangement of alternately arranged bonded and unbonded areas of the lining;

Fig. 6 is a side elevational view, partly in section, of a braking apparatus for a vehicle road wheel and including the improved shoe assembly.

Referring to the drawings, and particularly Fig. 6, a typical vehicle road wheel braking apparatus includes a drum 6 rotatable with the vehicle road wheel, a mounting plate 7, and a pair of brake shoe assemblies 8 pivotally secured to the plate by pins 9 and 10, respectively. The pin 9 for one shoe 8 supports a cylinder 11 into which the non-pivoted end of the other shoe assembly extends and the pin 10 for the latter shoe assembly supports a cylinder 12 into which the non-pivoted end of the said one shoe extends. The cylinder 11 is typical and contains a piston 13 which is actuated by forcing fluid thereinto, in a direction to cause the associated shoe assembly to engage with the drum 6. The latter rotates in a clockwise direction as viewed in Fig. 6, when the vehicle is moving forwardly and each shoe assembly 8 is correspondingly rotated by its piston to engage the drum and produce a braking action. As is well known in braking systems of this type employed in motor vehicles, fluid is simultaneously forced into the cylinder or cylinders of each road wheel from a master cylinder, the latter forming no particular part of the invention and is omitted for the sake of brevity. In the illustrated two-wheel cylinder arrangement fluid is initially forced into the cylinder 11 and thence to the cylinder 12 through a conduit 14. The fluid inlet opening in the cylinder 11 is indicated at 15. The shoe assemblies 8 are urged by springs 16 in a direction away from the drum 6.

In the illustrated arrangement the shoes rotate in a direction to induce a form of servo-action for engagement with the drum and in operation each shoe is equally effective in producing the braking force applied to the associated wheel.

Referring to Figs 1 to 3, a typical shoe assembly 8 includes an arcuate metal shoe 16 generally T-shaped in cross section and having a web 17 provided with an opening 18 for the pivot pin and a band 19. A strip of brake lining material 20 is surface bonded to the band 19 by a film of adhesive indicated at 21. As shown in Figs. 2 and 3, substantially less than the entire surface of the lining is adhered to the registering surface of the shoe band 19, the adhered area of the lining being adjacent each longitudinal edge thereof and an area indicated at 22 intermediate such adhered areas is not directly secured to the band and is free for limited movement relatively thereto during application of the assembly 8 to the drum to produce the braking action. Such relative movement, as heretofore pointed out, serves to absorb energy which would otherwise induce vibration of the drum and produce the high pitch noise. The spaced bonded areas adjacent the lateral edges of the lining 20 extend the entire length of the latter. This lateral edge bonding prevents the edges of the lining turning away from the shoe and eliminates the tendency of such free edges to produce a high pitch noise when engaged with the drum, particularly upon a relatively light application of the shoes to the drum. As a further feature, the arrangement permits the ready insertion of a tool between the band and lining for forcibly removing the latter.

The surface bonding film 21 may be of the cement type adhesive disclosed in Saunders and Morrison Patent 2,376,854 of May 22, 1945. The adhesive may be applied to the surface of the band 19 or the lining 20 at the areas selected for bonding, as indicated in the drawings, and then converted from a solidified unset state of a cured or set state by the application of a curing tempertaure and simultaneously pressing the lining and band together. Any suitable surface bonding adhesive material having the properties necessary for adhering the surfaces of the shoe and lining elements together may be employed.

Referring to Fig. 4, the lining material 20 is secured to the shoe 16 by a film of cement 21 as in the previous embodiment, but in this modification the bonded surface areas are spaced longitudinally of the shoe, that is, circumferentially with respect to its arcuate contour. The non-bonded or adhered surface regions are indicated at 23, it being understood that the sections of the lining 20 at the areas 23 are not directly secured to the band 19 and are relatively free to move with respect to the latter to minimize drum vibration as in the main embodiment. In this form of the invention the longitudinal edges of the lining are bonded to the band 19 only at locations spaced sufficient to prevent any appreciable upturning of such edges.

Referring to Fig. 5, the embodiment is generally similar to that of Figs. 1 to 3 in that the lining 20 is adhered at the longitudinal edges thereof to the band 19 as indicated at 21. However, instead of the relatively wide unbonded area as in Figs. 1 to 3, there is provided a plurality of alternately arranged bonded areas and unbonded areas intermediate the longitudinal edge bonded areas, the latter being indicated at 24. Should it be expedient to employ an adhesive requiring a relatively thick coating or film and thus resulting in a substantial space between the registering surfaces of the band and lining at the unbonded areas, the relatively small lateral dimension of each unbonded area will minimize any tendency of the lining to deflect at the unbonded areas, particularly immediately adjacent the bonded areas, in response to pressure between the lining and shoe incident to application of the same to the drum.

Although but several specific embodiments of the invention have herein been shown and described, it will be understood that various changes in the size, shape, and arrangement of parts may be made without departing from the spirit of the invention.

I claim:

1. In a brake shoe assembly of the type adapted to frictionally engage a drum, a shoe element including an arcuately extending rim, a lining including an arcuately extending element of friction material having a central body of uniform thickness and opposite end portions, and an adhesive material directly bonding areas of concave face at said end portions and said central body to the convex face of said rim, another area of said concave face at said central body being free from such bonding, and the convex face of said central body having an area opposite the bonded area of the concave face of such body adapted to engage the drum.

2. In a brake shoe assembly of the type adapted to frictionally engage a drum, a shoe element including an arcuately extending rim, a lining including an arcuately extending element of friction material having a central body of uniform thickness and opposite end portions, and an adhesive material directly bonding spaced areas of the concave face of said friction material to the convex face of said rim, each of said bonded areas extending inwardly from a lateral extremity of said concave face and continuously lengthwise of said face from one of said end portions to the other thereof, said concave face having an area intermediate said bonded areas free from said bonding, and the convex face of said friction material having areas thereof respectively opposite said bonded areas adapted to engage the drum.

3. In a brake shoe assembly of the type adapted to frictionally engage a drum, a shoe element including an arcuately extending rim, a lining including an arcuately extending element of friction material having a central body of uniform thickness and opposite end portions, and an adhesive material directly bonding said rim to areas of the concave face of the friction material respectively located at said end portions and said central body, the last mentioned area extending from one lateral extremity of said face to the other such extremity, said face having other areas free from said bonding, and the convex face of said lining material having an area opposite said last mentioned area adapted to engage the drum.

4. In a brake shoe assembly of the type adapted to frictionally engage a drum, a shoe element including an arcuately extending rim, a lining including an arcuately extending body of friction material, the concave face of said material having a width coextensive with the width of the material and presenting a smooth surface throughout its area, and an adhesive material directly bonding spaced areas of said concave face to a face of said rim, said bonded areas extending lengthwise of said friction material and including portions of said concave face respectively adjacent the lateral extremities thereof, an area of said concave face intermediate said bonded areas being free from said bonding, and the convex face of said firction material having areas respectively opposite said bonded areas adapted to engage the drum.

WILLIAM R. RODGER.

REFERENCES CITED

The following references are of record in the file of this patent:

UNITED STATES PATENTS

| Number | Name | Date |
|---|---|---|
| 769,836 | Russell | Sept. 13, 1904 |
| 1,445,070 | Clune | Feb. 13, 1923 |
| 1,563,368 | Hutchinson | Dec. 1, 1925 |
| 1,664,855 | Gard | Apr. 3, 1928 |
| 1,947,894 | Whitworth | Jan. 4, 1929 |
| 1,707,515 | Evans | Apr. 2, 1929 |
| 1,756,936 | Bendix | May 6, 1930 |
| 1,812,028 | Whitworth | June 30, 1931 |
| 1,917,993 | Morris | July 11, 1933 |
| 2,376,854 | Saunders | May 22, 1945 |